Figure 1:
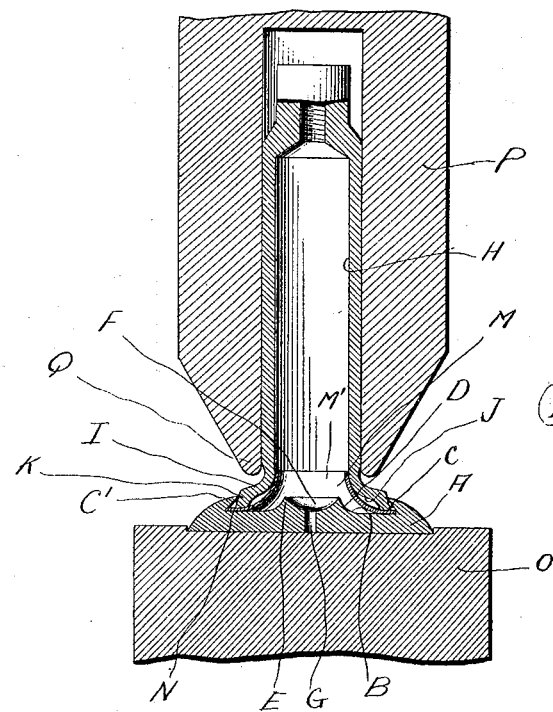

Jan. 19, 1932. W. C. OSTERHOLM 1,842,110
METHOD OF FORMING VALVE TAPPETS
Filed Oct. 3, 1927

Inventor
William C. Osterholm
By Whittemore Hulbert
Whittemore & Belknap
Attorneys Patented Jan. 19, 1932

1,842,110

UNITED STATES PATENT OFFICE

WILLIAM C. OSTERHOLM, OF DETROIT, MICHIGAN, ASSIGNOR TO WILCOX PRODUCTS CORPORATION, OF DETROIT, MICHIGAN, A CORPORATION OF MICHIGAN

METHOD OF FORMING VALVE TAPPETS

Application filed October 3, 1927. Serial No. 223,703.

The invention relates to the manufacture of valves, valve tappets and the like and has for its object the obtaining of a structure built up from a separately formed head and stem and having properties particularly adapting the same for use in internal combustion engines. The present invention is an improvement over that described in my Patents Numbers 1,650,444 and 1,650,645.

In the drawings

Figure 3:
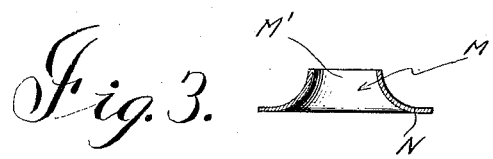
Figure 2:
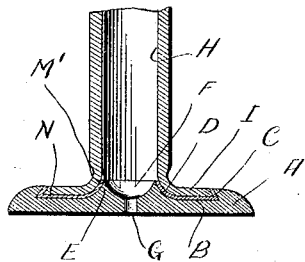
Figure 4:
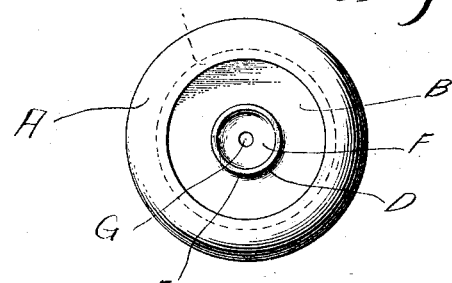

Figure 1 illustrates the method of uniting a head stem and intermediate sleeve together to form the improved structure, Figure 2 is a longitudinal section through the completed structure, Figure 3 is a longitudinal section through the brazing tube, Figure 4 is a plan view of the head member.

The construction forming the subject matter of this invention is built up from two separate pieces, a head member A and a stem member H. These two members are formed in substantially the same manner as indicated in the applications above referred to, the head being provided with an annular recess B, the outer circumferential edge C of which is undercut to form a shoulder C' as illustrated in Figure 1. The bottom of the recess is preferably curved upwardly as indicated at D forming the central raised portion or flange E. Preferably this raised portion has a depression F within the same communicating with the central aperture G, which latter extends through the head and forms a lubricant passageway.

The stem H is tubular and is provided with an outwardly flaring lower portion I, the maximum diameter of which is slightly less than the diameter of the shoulder C'. The under side of the flange I is substantially conical as indicated at J and is provided with a marginal down-turned annular flange K. M is a tubular member formed of brazing material having its upper end M' of a diameter to fit within the tubular stem B and having a flanged lower end N of a diameter to fit within the recess in the head member.

In order to assemble the stem to the head the latter is placed in a suitable holder O while the former is placed in a cooperating holder P, the arrangement being such as to permit pressure to be exerted between said holders. The tubular member M is then inserted in the recess within the head and the stem superposed so that the flaring flange I also engages the annular recess in the head member. The down-turned flange K is slightly oblique with respect to the lower surface of the annular recess in the head member. The holder P has an annular nose Q engaging the outwardly flared flange I and when pressure is applied to the holder the flange K is turned outwardly to engage the under cut portion C of the head and is expanded to form an interlocking engagement therewith. This interlocking is facilitated by the angular movement of the flange K which expands the lower portion to a greater diameter than the upper portion, thus causing the flange to conform to the shape of the undercut wall. The stem is also caused to conform to the curved raised portion of the head thereby entirely filling the annular recess without forming any sharp bends. The tubular member M is deformed at the same time as the flange I and forms a thin layer of metal between the stem and the head. This is clearly shown in Figure 2 which figure shows also that the flange I has been turned to extend radially outward and lies substantially in a plane perpendicular to the axis of the stem.

In order to complete the bond between the stem and head members the parts after having been mechanically united as indicated above are placed in a furnace so that the joint is heated to a temperature high enough to melt the tubular member M and cause the same to effect a brazed joint.

It will of course be understood that any suitable materials may be used in the construction of the head and stem members, but in the preferred construction the head is composed of white iron since this material can be hardened to produce a wear resisting surface. The head may be cast to the form indicated in Figure 1 or if desired it may be cast without the recess therein and the recess machined in the same after the head has been normalized to render it machinable. The stem is preferably made of steel such for example as a steel having .35% carbon.

It is usually desirable that the valve tappet be heat treated in order that the head member may have a hard wear resisting surface and the stem member may be rendered tough. This heat treatment can be carried out at the same time that the brazing operation is carried out thereby accomplishing two beneficial results with a single operation. The assembled tappets are heated to a temperature sufficiently high to harden the head, refine the stem and melt the brazing material. To facilitate the brazing it is preferable that the head and stem members of the tappet should have been immersed in a fluxing agent prior to their assembly by endwise pressure. After the tappet has reached the required temperature it is quenched in oil or water to harden the head and solidify the brazing material. The temperature used in the heat treatment depends upon the type of materials used but where the head is white cast iron and the stem is a medium carbon steel, a temperature of 1550° F. is approximately correct for obtaining the desirable physical properties.

The tappet resulting from the operations described above is cheap to manufacture but possesses the necessary physical properties for long life and useful service. It should be noted that the head and stem are united by two separate means which cooperate to make a very strong joint. The stem is mechanically interlocked to the head by reason of the flange on the stem engaging beneath the undercut shoulder on the head. The parts are also firmly united by the bond of brazing material which has considerable contact with the surfaces of both the stem and the head. The mechanical interlock is of itself sufficient to prevent the head and stem from separating, but under certain conditions these parts might become sufficiently loosened to allow for a relative rotation except for the fact that the surfaces are brazed together.

What I claim as my invention is:

1. The method of brazing the head member of a valve tappet to the stem member thereof, the head member being formed with an annular recess having an undercut shoulder and the stem member being formed with a hollow interior and with a flange flaring outwardly and adapted to be inserted into the annular recess of the head member, which consists in forming a tubular member of brazing material having a flaring flange insertable in the recess in said head member, assembling the stem and head members with the tubular brazing member intermediate the same, applying endwise pressure to said stem and head to mechanically interlock said members, and heating the assembled members to melt said brazing material.

2. The method of brazing the head member of a valve tappet to the stem thereof, the head being formed with an annular recess having an undercut shoulder at the outer edge thereof and an upwardly curved surface at the inner edge and the stem member being tubular and being formed with an outwardly flaring flange terminating in an annular portion insertable in said recess and extending oblique to the surface of the same, which consists in forming a brazing member having a tubular upper portion insertable in said tubular stem and having an outwardly flaring lower flange substantially conforming to the flange on said stem and insertable in the recess in said head member, introducing said stem member into said head member with the brazing member intermediate the same, applying endwise pressure to force the flange of the stem member into interlocking engagement with the undercut shoulder of the head member, and subjecting the united head member and stem member to a brazing temperature to braze said parts together in an addition to the mechanical interlock.

In testimony whereof I affix my signature.

WILLIAM C. OSTERHOLM.